United States Patent [19]

Im et al.

[11] Patent Number: 5,355,843
[45] Date of Patent: Oct. 18, 1994

[54] HEAT TRANSFER MECHANISM WITH THIN FILAMENTS INCLUDING CERAMIC HIGH TEMPERATURE HEAT EXCHANGER

[75] Inventors: Kwan H. Im, Naperville; Rajesh K. Ahluwalia, Burr Ridge, both of Ill.

[73] Assignee: University of Chicago, Chicago, Ill.

[21] Appl. No.: 90,766

[22] Filed: Jul. 12, 1993

[51] Int. Cl.$^5$ .............................................. F22B 23/06
[52] U.S. Cl. ................................ 122/367.2; 122/44.2; 122/155.2; 165/183; 165/185
[58] Field of Search ....................... 165/183, 184, 179; 122/367.2, 44.2, 155.2

[56] References Cited

U.S. PATENT DOCUMENTS 3,881,547  5/1975  Lavering .......................... 165/183 X
4,702,312 10/1987  Brown ................................ 165/179
4,705,106 11/1987  Hornack et al. .................... 165/179

OTHER PUBLICATIONS

Future Power Plants and Industrial Process Application, "Development of a Ceramic Recuperator for Industrial Applications", M. Coombs, AiResearch Manufacturing Company, S. Richlen, U.S. Department of Energy, and W. Liang, Gas Research Institute, pp. 567–573 no date.
Future Power Plants and Industrial Process Application "Ceramic Heat Exchangers for Coal Fired and Dirty Gas Application", W. R. Laws and G. R. Reed, pp. 550–567, Peabody Encomech, Ltd., Maidstone, U.K. no date.
Basic Problems in High Temperature Heat Exchangers, "Augmented Heat Exchangers For High Temperature Applications", A. E. Bergles, pp. 39–59, Heat Transfer Laboratory, Department of Mechanical Engineering, Iowa State University, Ames, Iowa 60011 no date.
High Temperature Heat Exchangers Development, "Future Development of High Temeperature Heat Exchangers, Y. Mopri, Department of Mechanical Engineering, University of Electro-Communications", Chofugaoka, Chofu, Tokyo, Japan 1982 no date.

Primary Examiner—Edward G. Favors
Attorney, Agent, or Firm—Emrich & Dithmar

[57] ABSTRACT

A radiative heat transfer mechanism in a furnace having burners through which pulverized coal and air are burned producing combustion gases and contaminants. A plurality of elongated conduits are positioned inside the furnace proximate to the burners generally parallel to the flow of combustion gases in the furnace. A plurality of thin filaments are inside each of the elongated hollow conduits, the filaments having diameters in the range of from about 1 micrometer to about 1,000 micrometers and having an infrared radiation cross-section sufficient to cause the filaments to heat upon exposure to infrared radiation. Blower mechanism is associated with the elongated conduits for limiting the amount of soot and ash which deposit on the conduits to preserve the radiative and convective transfer of heat energy from the combustion gases to the conduits.

22 Claims, 4 Drawing Sheets

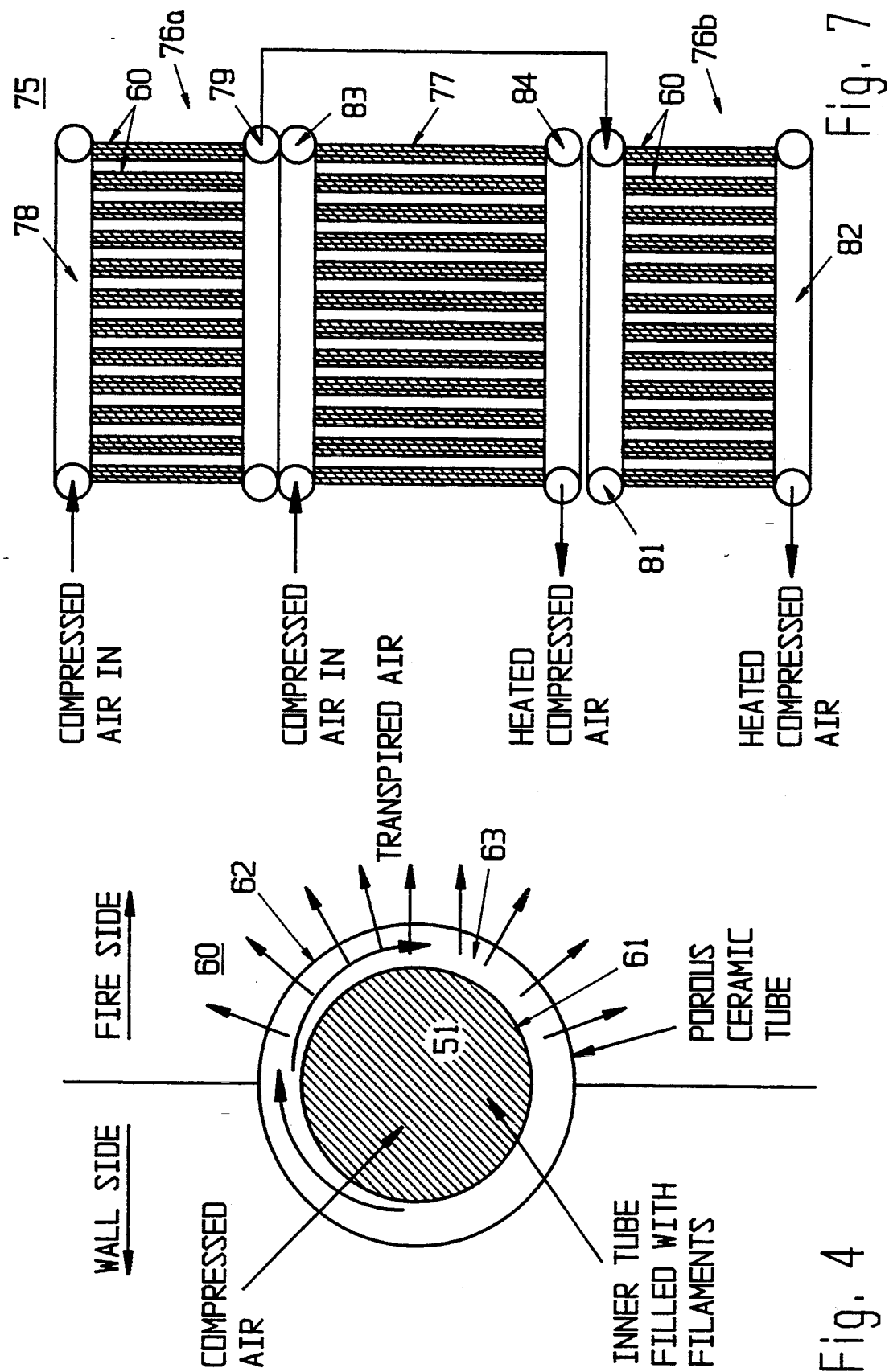

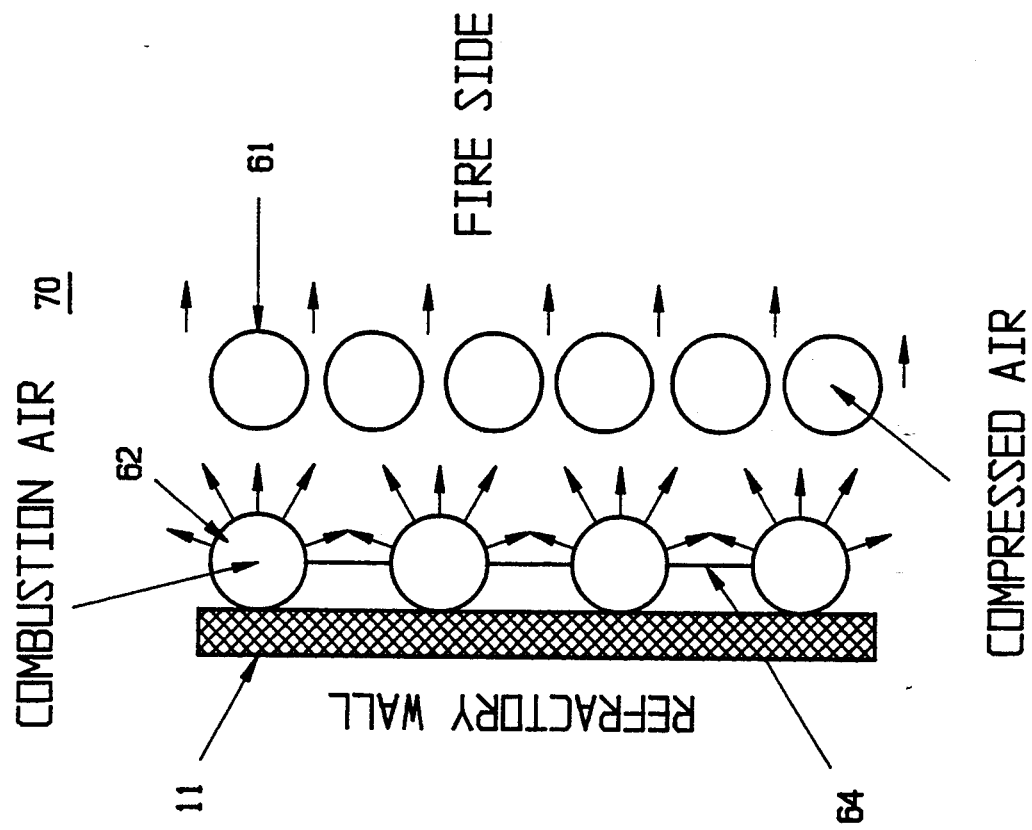
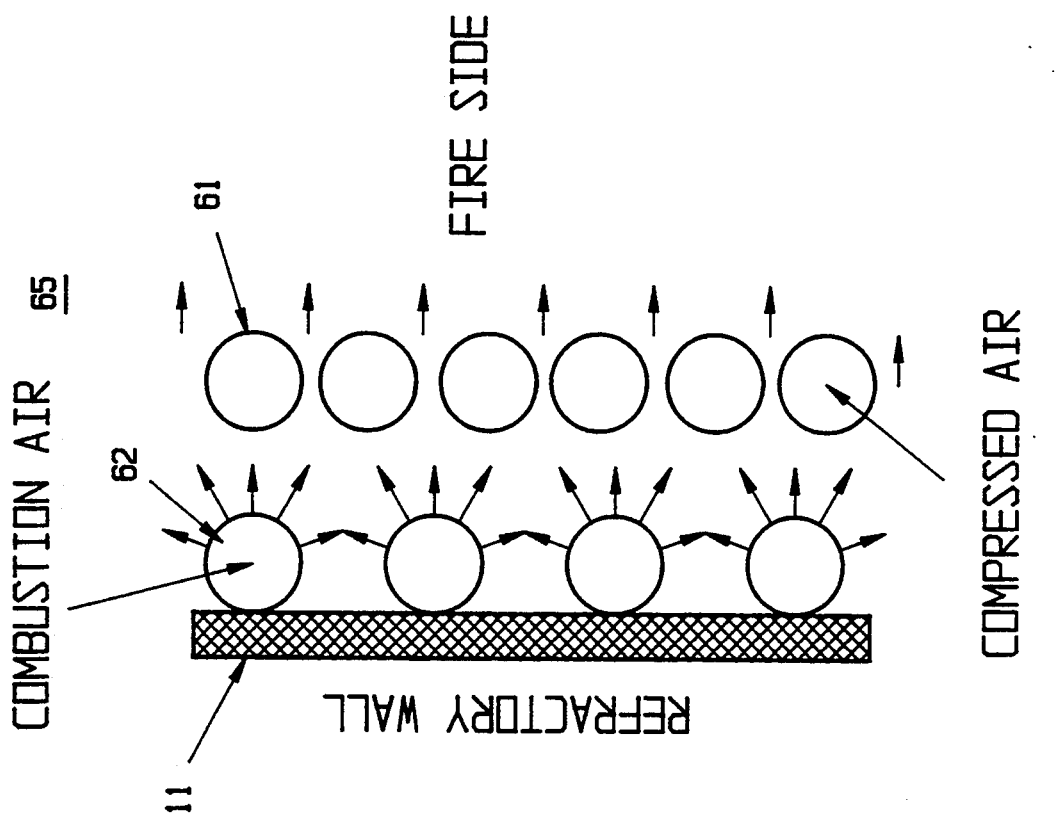

HEAT TRANSFER MECHANISM WITH THIN FILAMENTS INCLUDING CERAMIC HIGH TEMPERATURE HEAT EXCHANGER

CONTRACTUAL ORIGIN OF THE INVENTION

The U.S. Government has rights in this invention pursuant to Contract No. W-31-109-ENG-38 between the U.S. Department of Energy and The University of Chicago representing Argonne National Laboratory.

BACKGROUND OF THE INVENTION

In many industrial applications involving heat transfer from flue gases to a clean gas flowing inside tubes, it is desirable to improve the tube-side heat transfer coefficient. For instance, in heat exchange tubes in high-temperature applications, such as fluidized bed combustors, with the combustion products on the outer wall, there is a large difference in the heat transfer coefficients between the inner and outer walls. Published literature, for instance an article entitled "*Future Development of High Temperature Heat Exchangers*" by Y. Morri, Department of Mechanical Engineering, University of Electro-Communications, Chofugaoka, Chofu, Tokyo, Japan 182, teaches a 10% to 70% increase in heat transfer coefficients by the use of twisted tape or cross tape positioned inside the tubes. In other conventional methods, the heat transfer coefficient is attempted to be increased by raising gas velocity, the use of rough internal surfaces for turbulent flow and the use of fins. These methods incur an off-setting penalty of increased pressure drop or material cost.

In the subject invention, an alternative method and structure is provided which produces increased heat transfer coefficients using radiative means. Normally, radiation is not an effective mode of tube-side heat transfer because the mean beam length is small, on the order of 2.5 to 7.6 cms, and because the gas may be transparent to thermal radiation. To create a participating medium, thin filaments are dispersed inside the tubes of the heat exchanger. The filaments are heated radiatively by the tube surface and, thereafter, transfer the heat convectively to the flowing gas inside the tubes. By this means, the filaments are nearly isothermal with the gas by virtue of the high heat transfer coefficient and the extended surface area obtained with the use of thin filaments.

OBJECTS AND SUMMARY OF THE INVENTION

Accordingly, it is the principal object of the present invention to provide a method and apparatus for increasing the tube-side heat transfer coefficient in high temperature situations.

Another object of the invention is to provide a method and apparatus for increasing the tube-side heat transfer coefficient in a high temperature ceramic heat exchanger for application in indirectly-fired gas turbine cycles using dirty fuels such as coal.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 4 is a cross-sectional view in a plane transverse to the longitudinal axis of a tube showing one embodiment of heat transfer tubes suitable for an indirectly-fired gas turbine cycle;

FIG. 5 is another embodiment of the present invention useful in a combined cycle plant using an indirectly-fired gas turbine and a fuel such as coal;

FIG. 6 is yet another embodiment of the present invention useful in a combined cycle plant using an indirectly-fired gas turbine and a fuel such as coal; and FIG. 7 is a schematic illustration showing a two-stage two-stream configuration of furnace walls used to heat compressed air in a pulverized coal furnace.

DESCRIPTION OF THE PREFERRED EMBODIMENT

Although there are a variety of uses for the radiative heat transfer conduits or tubes described herein, it will be described principally with respect to a High Temperature Advanced Furnace in which the purpose thereof is to raise superheated steam for the Rankin cycle and to heat the clean working fluid such as air to 1800° to 2400° F. for the Brayton cycle. The requirement for the Brayton cycle represents a major departure from conventional pulverized coal furnaces in which steam is generally raised to a maximum of 1000 to 1150° F. An important difference in a High Temperature Advanced Furnace is the heat absorption characteristics of the furnace system and the gas/surface temperature profiles.

Another important difference is the chemical/physical characteristics of the ash deposit layers which are likely to be dominated by alkali sulfates rather than pyrosulfates or alkali-iron-trisulfates. A major difficulty with the High Temperature Advanced Furnace design is the selection of materials and systems to combat severe fouling and corrosion of heat exchange surfaces when exposed to higher than normal temperatures.

Figure 1:
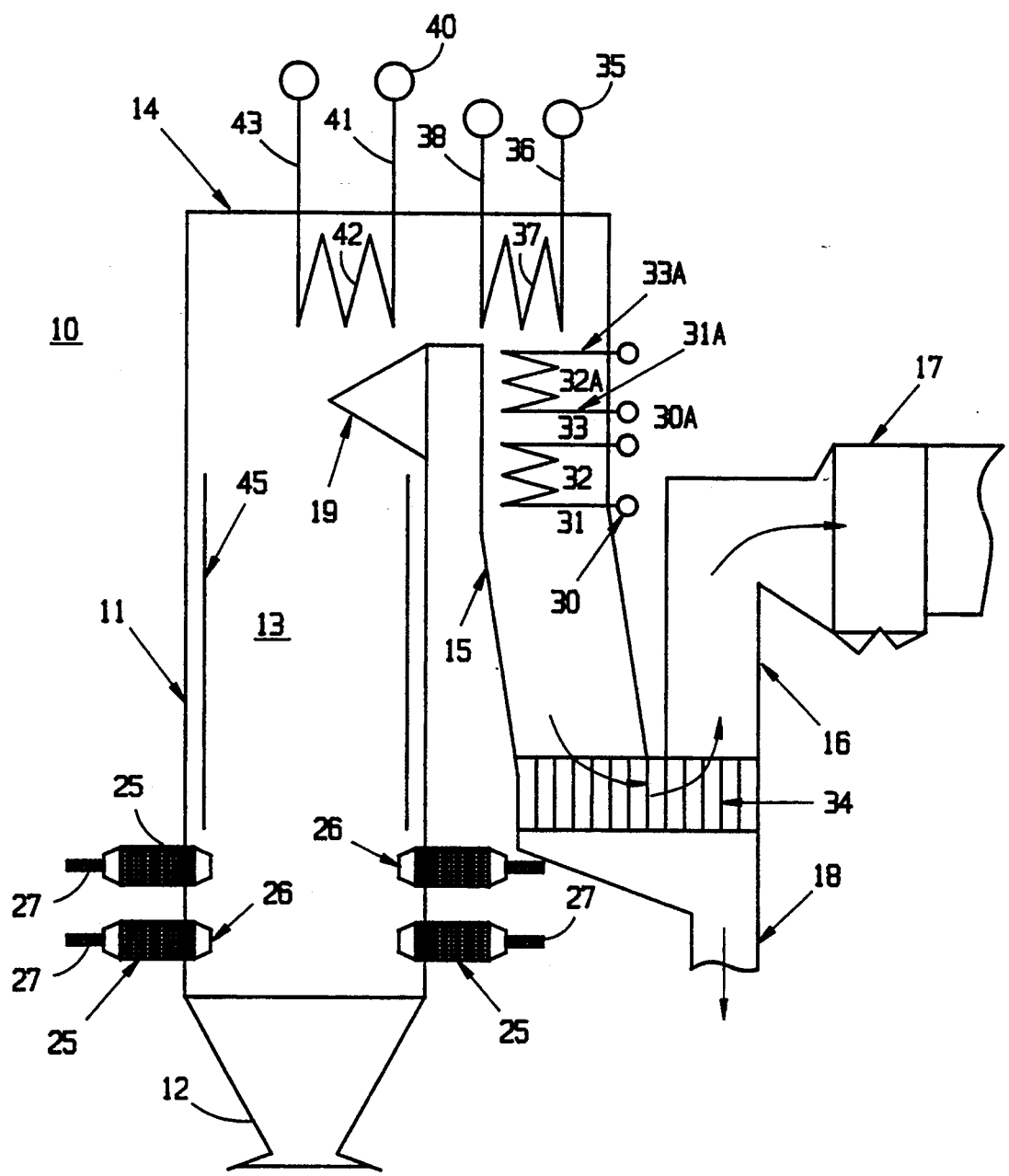
FIG. 1 is a schematic view of a furnace burning pulverized coal using embodiments of the present invention to provide improved heat transfer coefficients.

Referring now to FIG. 1, there is shown schematically a high temperature furnace 10 with a housing 11 containing the various accessories for the furnace 10 and includes a frustoconical bottom portion 12 and a combustion chamber 13. A top wall 14 covers a downwardly extending duct portion 15 and a discharge duct 16 leading to a stack portion 17. An ash hopper 18 is provided with a bottom discharge (not shown) for removal of ash from the system, and a flow director 19 extends inwardly of the combustion chamber 13 so as to direct the flow of gases outwardly and around toward the duct work 15.

A plurality of burners 25 are provided above the frustoconical portion 12 and below the combustion chamber 13, each of the burners 25 being provided with a nozzle 26 and a supply conduit 27 for connection to a source of pulverized coal and air. It should be understood that although four such burners 25 are illustrated in the schematic drawing of FIG. 1, there may be any number of burners associated with the high temperature furnace 10.

Disposed in the upper portion of the furnace 10 are an economizer 30 and primary superheater 30A including inlet lines 31 and 31A, heat exchange portions or sections 32 and 32A and outlet lines 33 and 33A. The economizer 30 and primary superheater 30A are positioned in the duct portion 15 and are contacted by combustion gases. An air preheater 34 is located downstream from the economizer 30 and is constructed and arranged to preheat air using waste heat from the combustion gases, the air preheater 34 serving to elevate the temperature of the air being fed to the burners 25 with pulverized coal.

Also provided in the furnace 10 is a steam reheater 35 positioned just upstream of the primary superheater 30A, the steam reheater having an inlet line 36, a heat exchange portion 37 and an outlet line 38. Further upstream is located the steam superheater 40 also including an inlet line 41, a heat exchange portion 42 and an outlet line 43. In a high temperature furnace 10, the combustion gas temperature near the steam superheater 40 will be in the neighborhood of 1300° K which is sufficient to heat the steam in the steam superheater 40 to a temperature in the range of from about 1000° to 1100° F. The steam reheater 35 is heated to a temperature in the same general range, but may be slightly lower than the steam superheater 40.

Figure 2:
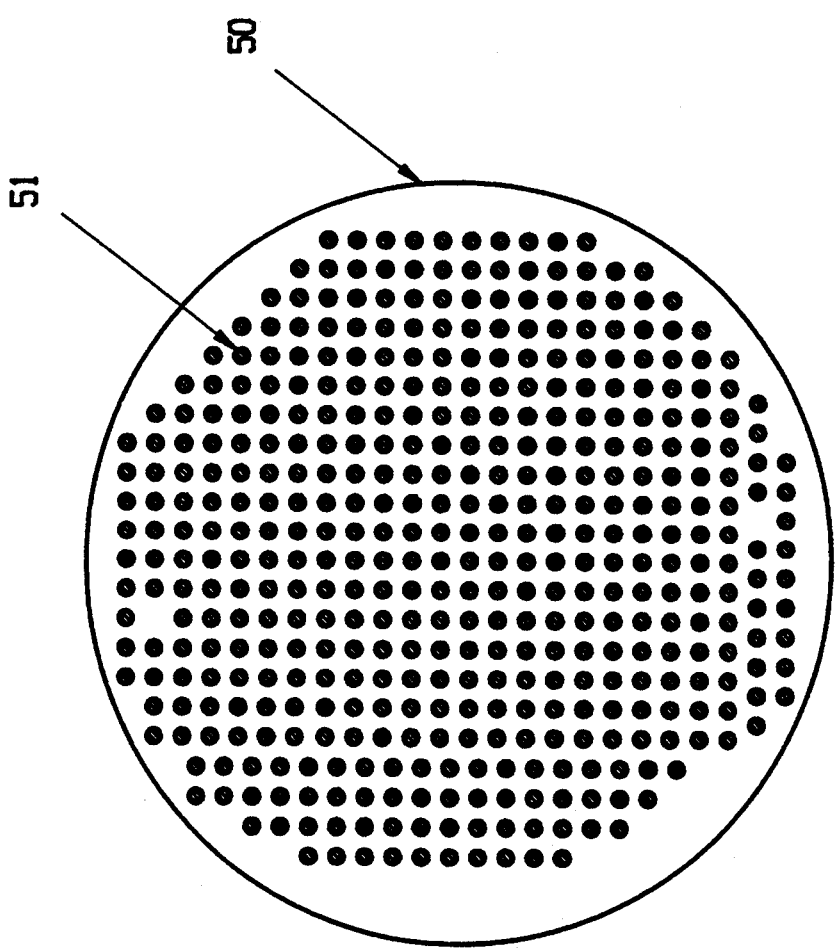
FIG. 2 is an enlarged cross-sectional view of a heat transfer tube made in accordance with an embodiment of the present invention showing a plurality of thin filaments positioned inside a heat transfer tube within the furnace illustrated in FIG. 1.

An air wall 45 is positioned inside the housing 11 near the burners 25 and well within the combustion chamber 13. As shown in FIG. 2, the air wall 45 includes a plurality of conduits or tubes 50, each including a large number of filaments 51. The conduits or tubes 50 are made from a variety of suitable materials depending upon the temperatures reached in the combustion chamber 13 and may be preferably ceramic such as SiC, $Al_2O_3$ or $SiO_2$. Depending on the temperatures, various high melting point metals or alloys thereof may be used. Illustrative of suitable metals are the Zircalloys, Inconels, tungsten, cobalt, nickel, iron and alloys thereof. Important properties for the filaments are integrity at the operating temperature of the furnace 10 and favorable optical properties which generally includes a high infrared radiation absorption cross section. The filaments 51 preferably have diameters in the range of from about 1 to about 1000 micrometers and also may be made, depending upon the temperatures reached in the furnace 10, of ceramic or metal.

In the high temperature furnace as well as other applications such as heat recuperators for use in glass melting and steel making processes, the number of filaments in a conduit or tube 50 should be such that the calculated porosity is in the range of from about 80% to about 99.6% but in any event less than 100%, the preferred porosity being in the range of from about 80% to about 90%. Porosity is a function of the number of filaments in the conduit or tube and the diameter of the filaments. For a situation where all the filaments have substantially the identical diameter, the porosity is calculated as being equal to $1 \eta d^2/4 \cdot N$ where d is the filament diameter and N is the number of filaments. For a filament diameter of 100 micrometers which is equal to $10^{-2}$ cm and N=300/2 cm, the calculated porosity is $\frac{\pi}{4} \times 10^{-4} \times 300 = 0.9764$ which equals 97.64%. In general, the number of filaments may range from about $30/cm^2$ to about $600/cm^2$, again depending upon the conduit and filament diameters and the calculated porosity.

Figure 3:
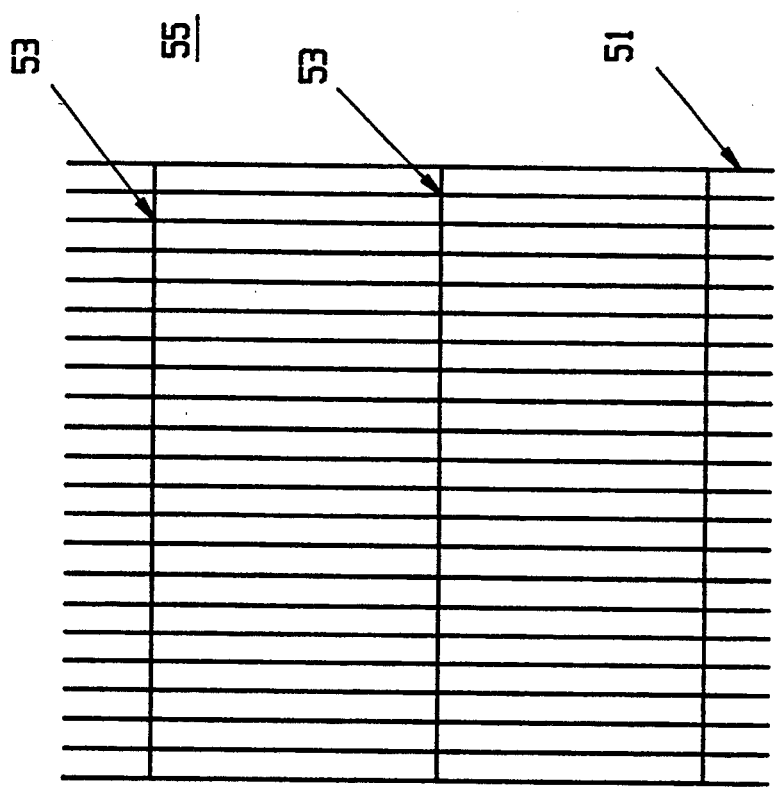
FIG. 3 is a side elevational view of a portion of the filaments illustrated in FIG. 2 in mesh configuration.

FIG. 3 shows the method by which the filaments may be retained inside a tube 50 by forming a mesh 55 having the individual filaments 51 extending in a direction parallel to the flow of combustion gases and cross members 53 at spaced apart intervals therealong thereby forming a mesh configuration which may be rolled and inserted into a conduit or tube 50 as illustrated in FIG. 2.

Theoretical calculations have been performed to assess the invention. In one of the calculations, filaments of 50 -$\mu$m diameter were dispersed inside a 6.35 $-$cm diameter tube. The number density of filaments was $300/cm^2$, yielding a porosity higher than 99%. An extinction coefficient of 9.5 $cm^{-1}$ and a scattering albedo of 0.91 were calculated from the electromagnetic wave theory applied to normally-illuminated, metallic (iron) cylinders. The resulting optical thickness is about 60.3. The optical data were used in radiation transport theory for absorbing-emitting-scattering media. Results from theoretical calculations for compressed air at 10 atmospheres shows an enhancement in tube-side heat transfer coefficient from 200–300 $W/m^2 \cdot K$, obtainable with convection from smooth walls, to 500–1100 $W/m^2 \cdot K$ with filaments. As is characteristic of radiation transport, the higher the surface temperature, the greater the enhancement in heat transfer.

Similar improvements in heat transfer are obtained with filaments made from other metals (tungsten, cobalt, nickel and alloys) and metal oxides. Additional pressure drop ($\Delta P$) drop has been estimated to be less than 1–3% of $\Delta P$ with smooth tubes.

There is considerable interest in developing technology for a pressurized, high-temperature ceramic heat exchanger for application in indirectly-fired gas turbine cycles using dirty fuels such as coal. The overall cycle efficiency is especially attractive (>47%) if the heat exchanger can raise air temperature higher than 1533 K (2300° F.). This requires locating the heat exchanger in the hottest section of the coal furnace 10 making it particularly vulnerable to corrosion and fouling.

There are four main features of the subject invention. First, it uses an air-wall construction rather than the conventional water-wall design. The primary mode of heat transfer is thermal radiation rather than convection as in conventional cross-flow and counterflow heat exchangers. With radiation, one can realize a heat transfer coefficient ($h_o$) in the range 600–1200 $W/m^2 \cdot K$, which is an order of magnitude higher than 50–100 $W/m^2 \cdot K$ that is obtainable with convection. With an air-wall design, heat transfer is one sided so that net $h_o$ is only $1/\eta$ times 600–1200 $W/m^2 \cdot K$—still a factor of four higher than convection.

Second, the subject invention as illustrated in FIG. 2 uses uniformly dispersed filaments 51 for enhancement of tube-side heat transfer coefficient ($h_i$).

Third, air is transpired through porous walls, as will be set forth to prevent the combustion products from coming in contact with the heat exchanger walls. The extent of transpiration is determined by the blow-off condition for turbulent boundary layers, i.e., transpiring air-to-mainstream mass flux ratio of 0.035. It has been shown that transpiration is effective in inhibiting particle deposition by diffusional mechanisms but is ineffective against inertial impaction. Thus, parallel flow, as provided for in the air-wall design, is preferable to cross-flow arrangement.

Finally, since the transpiration requirement is rather large, 8–10% of combustion air flow, a double-tube arrangement 60 is used in the embodiment of FIG. 4, but other embodiments are illustrated in FIGS. 5 and 6. Compressed air is passed through an inner tube 61. Air at intermediate pressure is passed through the annular region 63 formed between the inner cylinder 61 and the outer cylinder 62 and leaks out uniformly through the porous outer ceramic tube 62 into the furnace 10. A small fraction, nominally 10%, leaks out through the bottom (not shown). The air leaking into the furnace 10 is also used as oxidizer for fuel combustion.

In the double-tube 60 arrangement, heat is transferred by radiation from the flame to the outer porous tube 62. Inner tube 61 is heated radiatively by the outer tube 62. Air in the annular region 63 is heated by convection from the outer tube 62. Depending on design parameters, convection heat transfer can be from annular air to inner tube 61 or vice versa. Heat transfer from the inner tube 61 to compressed air is by both convection and radiation. Because the porous tube 62 receives radiation from furnace side only, large temperature gradients in the radial direction can be set up. For more uniform temperature distribution, the flow of annular air in annulus 63 can be swirled to achieve a convection heat transfer rate that matches the rate of radiative exchange between the outer and inner tubes.

Referring now to FIGS. 5 and 6, there are disclosed therein second and third embodiments of the present invention. FIG. 5 shows an embodiment 65 in which the wall 11 of the High Temperature Advanced Furnace 10 has a plurality of porous ceramic groups 62 adjacent the wall through which is passed air under moderate pressure such as 1.1–1.8 atmospheres, it being understood that pressures greater than the foregoing may be used where necessary in order to provide the amount of air flow required to prevent ash, soot and other combustion products from depositing on the walls of the nonporous conduits or tubes 61 positioned inwardly toward the combustion area 13 of the furnace. The advantage of the construction of embodiment 65 is that a double tube or concentric arrangement 60 is not required, rendering fabrication cost lower but clearly in the embodiment 65 the opportunity for contaminants to deposit onto the surfaces of the nonporous tube or conduit 61 carrying the compressed air is greater than the previous embodiment 60 illustrated in FIG. 4.

FIG. 6 shows yet another embodiment 70 in which porous tubes 62 are connected by a wall structure 64 so that the combination of the tube 62 and the wall structure 64 may replace the refractory wall 11 or enable the refractory wall 11 to be made of a less costly material. In other respects, the embodiment 70 is similar to that of embodiment 65 with transpiration of air through the porous ceramic tube 62 being sufficient to prevent or substantially reduce the amount of contaminants which are deposited on the exposed surfaces of the conduits or tube 61 carrying the compressed air which is heated due to the combustion taking place in the chamber 13.

By way of example for illustrative purposes only, 10 m × 10 m × 40 m coal furnace with a nominal heat release rate of 527 MWt. is chosen. FIG. 7 shows a two-stage, two-stream configuration of furnace walls used for heating 318 kg/s of compressed air at 11.5 atm to 1533 K from 900 K inlet temperature. Air, compressed to 1.8 atm and preheated to 900 K, constitutes the annular flow in annulus 63. Each stage consists of 400 tubes, 10 m long, 6.35-cm ID inner tube, a 8.38-cm ID outer tube. The tubes are 0.25-cm thick.

In FIG. 7, there is disclosed a configuration of concentric tubes 60, by way of illustration although the embodiments shown in FIGS. 5 and 6 may be substituted therefor, arranged so that each of the two stages receives substantially the same amount of heat from the combustion chamber 13. The arrangement 75 includes a split section forming an upper portion 76a and a lower portion 76b of the heat exchanger with an intermediate portion 77. The upper portion 76a includes a compressed air inlet header 78 and an outlet header 79, the outlet header 79 being connected to the inlet header 81 of the lower portion 76b which has an outlet header 82. Compressed air enters the inlet header 78 of portion 76a and is transmitted through the plurality of concentric tubes 60 to the outlet header 79 which is connected to the inlet header 81 of the portion 76b. The compressed air flowing therefrom through the tubes 60 to the outlet header 82. If the burners 25 are located vertically below the header 82, it will be seen that the hottest gas from the combustion by the burners 25 contacts the header 82 and the least hot gas contacts the header 78. Intermediate the portions 76a and 76b is a heat exchange portion 77 having an inlet header 83 and an outlet header 84 connected by a plurality of concentric conduits or tubes 60. The compressed air from the two stages 76a and 76b which is a split stage and the intermediate stage 77 in total receive approximately the same amount of heat and in this manner multiple stages may be arranged in the combustion chamber 13 so that overall, each of the multiple stages receives the same heat transfer although it is understood that the combustion gases cool as they travel upwardly away from the burners 25 toward the top of the furnace 10.

Referring now to Tables 1–4, heat transfer coefficients with thin filaments have been calculated for a variety of porosities and a variety of temperature profiles at the tube wall. It being understood that $T_w$ is the temperature at the tube wall and $T_e$ is the temperature of air at one atmosphere. The tube wall temperature is in Kelvin and as seen, the porosities extend from 80.4% to 99.6%. Tables 1–3 show various heat transfer coefficients calculated for differing numbers of filaments per tube and at different temperatures. Table 4 shows the difference in heat transfer coefficient for a variety of Delta "Ts", that is the difference between the temperature of the tube wall and the temperature of air within the wall.

TABLE 1

| | Heat Transfer Coefficient (W/m².K) | | | | |
|---|---|---|---|---|---|
| $T_w(K)$ | N = 0 | N = 50 | N = 100 | N = 200 | N = 300 |
| 600 | 47.89 | 64.49 | 66.21 | 67.53 | 68.31 |
| 700 | 50.40 | 76.91 | 80.13 | 82.54 | 83.96 |
| 800 | 52.60 | 93.33 | 98.63 | 102.6 | 104.9 |
| 900 | 54.58 | 114.0 | 122.1 | 128.2 | 131.7 |
| 1000 | 56.39 | 139.4 | 151.4 | 160.3 | 165.4 |
| 1100 | 57.91 | 169.7 | 186.8 | 199.5 | 206.7 |
| 1200 | 59.23 | 205.5 | 229.1 | 246.6 | 256.4 |
| 1300 | 60.61 | 247.3 | 279.1 | 302.8 | 315.8 |
| 1400 | 61.77 | 294.6 | 336.7 | 368.1 | 385.2 |
| 1500 | 63.07 | 348.2 | 402.8 | 443.7 | 465.7 |
| 1600 | 64.22 | 407.5 | 477.1 | 529.6 | 557.6 |

N Porosity (%)  N: Number of filaments/cm²

TABLE 1-continued

| $T_w(K)$ | Heat Transfer Coefficient (W/m².K) | | | | |
|---|---|---|---|---|---|
| | N = 0 | N = 50 | N = 100 | N = 200 | N = 300 |
| 50 | 99.6 | Tube diameter = 2.54 cm | | | |
| 100 | 99.2 | Filament diameter = 100 μm | | | |
| 200 | 98.4 | $T_w - T_a$ = 200K | | | |
| 300 | 97.6 | Volumetric Flow Rate = 18.24 Nm³/h | | | |

TABLE 2

| $T_w(K)$ | Heat Transfer Coefficient (W/m².K) | | | |
|---|---|---|---|---|
| | N = 0 | N = 50 | N = 100 | N = 150 |
| 600 | 47.89 | 66.81 | 68.21 | 69.06 |
| 700 | 50.40 | 81.10 | 83.70 | 85.28 |
| 800 | 52.60 | 99.92 | 104.3 | 106.9 |
| 900 | 54.58 | 123.6 | 130.4 | 134.5 |
| 1000 | 56.39 | 152.7 | 163.0 | 169.0 |
| 1100 | 57.91 | 187.3 | 202.4 | 211.0 |
| 1200 | 59.23 | 227.9 | 249.3 | 261.2 |
| 1300 | 60.61 | 275.0 | 304.6 | 320.8 |
| 1400 | 61.77 | 328.0 | 368.1 | 389.7 |
| 1500 | 63.07 | 387.6 | 440.7 | 468.9 |
| 1600 | 64.22 | 453.2 | 522.1 | 558.5 |

| N | Porosity (%) | N: Number of filaments/cm² |
|---|---|---|
| 50 | 96.5 | Tube diameter = 2.54 cm |
| 100 | 93.0 | Filament diameter = 300 μm |
| 150 | 89.4 | $T_w - T_a$ = 200K |
| | | Volumetric Flow Rate = 18.24 Nm³/h |

TABLE 3

| $T_w(K)$ | Heat Transfer Coefficient (W/m².K) | | | |
|---|---|---|---|---|
| | N = 0 | N = 50 | N = 100 | N = 150 |
| 600 | 47.89 | 66.63 | 67.72 | 69.22 |
| 700 | 50.40 | 80.64 | 82.70 | 85.52 |
| 800 | 52.60 | 98.89 | 102.4 | 107.2 |
| 900 | 54.58 | 121.5 | 127.2 | 134.7 |
| 1000 | 56.39 | 148.8 | 157.7 | 168.9 |
| 1100 | 57.91 | 180.7 | 193.9 | 210.4 |
| 1200 | 59.23 | 217.1 | 236.2 | 259.6 |
| 1300 | 60.61 | 258.7 | 285.3 | 317.5 |
| 1400 | 61.77 | 304.2 | 340.3 | 383.9 |
| 1500 | 63.07 | 354.4 | 402.1 | 459.7 |
| 1600 | 64.22 | 408.2 | 469.8 | 544.6 |

| N | Porosity (%) | N: Number of filaments/cm² |
|---|---|---|
| 30 | 94.1 | Tube diameter = 2.54 cm |
| 50 | 90.2 | Filament diameter = 500 μm |
| 100 | 80.4 | $T_w - T_a$ = 200K |
| | | Volumetric Flow Rate = 18.24 Nm³/h |

TABLE 4

| $T_w(K)$ | Heat Transfer Coefficient (W/m².k) | | |
|---|---|---|---|
| | ΔT = 100K | ΔT = 200K | ΔT = 300K |
| 600 | 77.36 | 69.06 | 60.66 |
| 700 | 95.44 | 85.28 | 76.52 |
| 800 | 119.7 | 106.9 | 95.84 |
| 900 | 150.4 | 134.5 | 120.6 |
| 1000 | 188.2 | 169.0 | 151.9 |
| 1100 | 233.9 | 211.0 | 190.4 |
| 1200 | 288.5 | 261.2 | 236.9 |
| 1300 | 352.2 | 320.8 | 291.9 |
| 1400 | 425.9 | 389.7 | 356.7 |
| 1500 | 509.7 | 468.9 | 431.1 |
| 1600 | 604.1 | 558.5 | 516.1 |

Number of filaments/cm² 150
Tube diameter = 2.54 cm
Filament diameter = 150 μm
Volumetric Flow Rate = 18.24 Nm³/h As can be seen, therefore, there has been illustrated a process and apparatus for enhancing the heat transfer characteristics in a High Temperature Advance Furnace by the use of thin filaments of material within the heat transfer tubes 50. Preferably, the heat transfer tubes 50 are positioned longitudinally within the furnace 10 so that combustion gases which may contain a variety of contaminants flow parallel to the heat transfer tube thereby permitting the transpiried air effectively to limit the amount of contamination which is deposited on the surface of the tubes.

In the prior art, the various cruciform shaped tapes and/or sections used to improve heat transfer resulted in a substantial pressure drop occurring within the tubes. A simple insert can increase the pressure drop to as much as about 80% and a cruciform insert can increase the pressure drop across the tube over 100%. The calculated pressure drop due to thin filaments in a tube is less than about 2% so that it is clear that the subject invention not only provides for significantly increased heat transfer coefficient by a factor of between about 4 and about 10 but the price that is paid for such an increase heat transfer coefficient in the terms of greater pressure drop is minimal.

While the invention has been described with respect to a high temperature furnace, it should be understood that there are a wide variety of usages in industry for the present invention including heat recovery recuperators in the glass industry as well as the steel making industry.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. Heat transfer mechanism for radiatively and convectively transferring heat between first and second gases, said heat transfer mechanism comprising an elongated hollow conduit having a first hotter gas on one side thereof and a second cooler gas on the other side thereof, and a plurality of elongated thin filaments inside said elongated hollow conduit, said filaments having diameters in the range of from about 1 micrometer to about 1,000 micrometers extending generally axially of said conduit and having an infrared radiation absorption cross-section sufficient to cause said filaments to heat upon exposure to infrared radiation, whereby heat energy from the first hotter gas is transferred to said conduit by radiation and convection and heat energy from said conduit is transmitted to said filaments by radiation and heat energy is transmitted from said filaments to the second gas by convection.

2. The heat transfer mechanism of claim 1 wherein at least some of the thin filaments are metal.

3. The heat transfer mechanism of claim 2 wherein said metals are iron, tungsten, cobalt, nickel and alloys thereof.

4. The heat transfer mechanism of claim 1 wherein at least some of the thin filaments are ceramic.

5. The heat transfer mechanism of claim 1 wherein the conduit and filaments are ceramic.

6. The heat transfer mechanism of claim 5, wherein the ceramic is selected from the group comprising SiC, $Al_2O_3$ and $SiO_2$.

7. The heat transfer mechansim of claim 1 wherein said filaments are present in the range of from about 30/cm² to about 600/cm².

8. The heat transfer mechanism of claim 1, wherein the calculated porosity of said conduit having filaments disposed therein is greater than 80% and less than 100%.

9. The heat transfer mechanism of claim 1, wherein the calculated porosity of said conduit having filaments disposed therein is in the range of from about 80% to about 90%.

10. The heat transfer mechanism of claim 1 wherein said filaments are frictionally retained in said elongated conduit.

11. The heat transfer mechanism of claim 1, wherein the filaments are in the form of a mesh positioned within said elongated hollow conduit.

12. The heat transfer mechanism of claim 1, wherein the first gas is air on the inside of said elongated hollow conduit.

13. The heat transfer mechanism of claim 1, wherein the first gas is compressed to an elevated pressure not greater than about 20 atm.

14. A radiative heat transfer mechanism in a boiler having burners through which pulverized coal and air are burned producing combustion gases and contaminants comprising a plurality of elongated conduits positioned inside said boiler proximate to said burners and generally parallel to the flow of combustion gases in the boiler, a plurality of thin filaments inside said elongated hollow conduit, said filaments having diameters in the range of from about 1 micrometer to about 1,000 micrometers and having an infrared radiation absorption cross-section sufficient to cause said filaments to heat upon exposure to infrared radiation, and means associated with said elongated conduits for limiting the amount of contaminants adhering to said conduits, thereby to preserve the radiative and convective transfer of heat energy from the combustion gases to said conduits.

15. The radiative heat transfer mechanism of claim 14, wherein said conduits are ceramic and said filaments are metal or ceramic.

16. The radiative heat transfer mechanism of claim 15, wherein the ceramic is one or more of SiC, $Al_2O_3$ or $SiO_2$ and the metal is one or more of Fe, W, Co, Ni and alloys thereof.

17. The radiative heat transfer mechanism of claim 14 and further comprising means for introducing air at a pressure in the range of from about 10 atmosphers to about 20 atmospheres into said conduits to transfer heat from the combustion gases to the pressurized air.

18. The radiative heat transfer mechanism of claim 14, wherein said means for limiting the amount of contaminants includes a coaxial outer porous conduit surrounding each elongated conduit forming an annulus therewith, means for establishing clean gas flow in each annulus at a pressure sufficient to cause transpiration of clean gas through said porous conduit at a rate at least equal to the blow-off condition for turbulent boundary layers of combustion gases at the outer surface of the outer porous conduits.

19. The radiative heat transfer mechanism of claim 18, wherein the coaxial outer conduits are porous ceramic or porous sintered metal.

20. The radiative heat transfer mechanism of claim 18, wherein said means for limiting the amount of contaminants includes blower means for blowing air transversely to the longitudinal axes of said elongated conduits along substantially the entire length thereof exposed to the combustion gases at a rate at least equal to the blow-off condition for turbulent boundary layers of combustion gases at the outer surface of said elongated conduits.

21. The radiative heat transfer mechanism of claim 20, wherein said blower means includes a plurality of elongated porous tubes positioned in the boiler such that said elongated conduits are between the flowing combustion gas and said elongated tubes and means for introducing air under pressure into said tubes to transfer therefrom at a rate sufficient to limit the amount of contaminants adhering to said conduits.

22. Heat transfer mechanism for radiatively and convectively transferring heat between first and second gases, said heat transfer mechanism comprising an elongated hollow ceramic conduit having a first hotter gas on one side thereof and a second cooler gas on the other side thereof, and a plurality of thin filaments inside said elongated hollow ceramic conduit, said ceramic filaments having diameters in the range of from about 1 micrometer to about 1,000 micrometers and having an infrared radiation absorption cross-section sufficient to cause said ceramic filaments to heat upon exposure to infrared radiation, whereby heat energy from the first hotter gas is transferred to said conduit by radiation and convection and heat energy from said conduit is transmitted to said ceramic filaments by radiation and heat energy is transmitted from said ceramic filaments to the second gas by convection.

* * * * *

UNITED STATES PATENT AND TRADEMARK OFFICE
CERTIFICATE OF CORRECTION

PATENT NO. : 5,355,843
DATED : October 18, 1994
INVENTOR(S) : Kwan H. Im et al.

It is certified that error appears in the above-indentified patent and that said Letters Patent is hereby corrected as shown below:

On the title page, item [56], Other Publications, "Japan 1982" should be --182--.

Column 8, "mechansim" should be --mechanism--.

Column 9, "atmosphers" should be --atmospheres--.

Column 10, line 39, 1,000micrometers should be --1,000 micrometers

Signed and Sealed this

Twenty-third Day of May, 1995

Attest:

BRUCE LEHMAN

Attesting Officer   Commissioner of Patents and Trademarks